April 18, 1961    E. R. GARGAN    2,980,474
SHAFTS FOR CARRYING INTERFERENCE-FITTED MEMBERS THEREON
Filed March 17, 1958    3 Sheets-Sheet 1
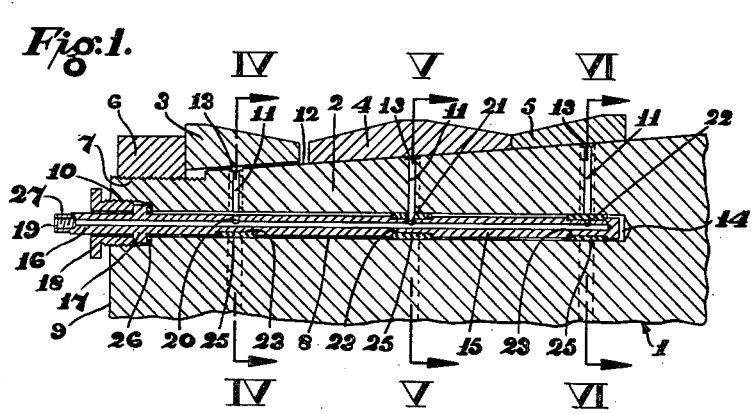
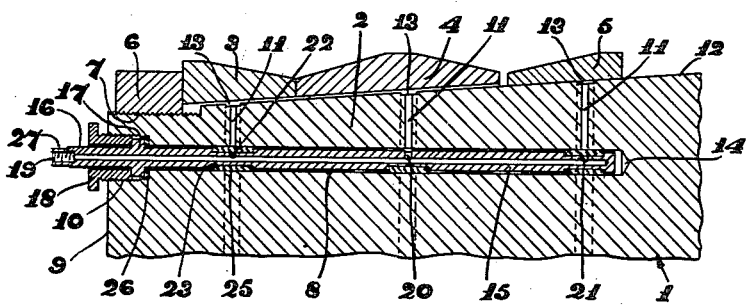
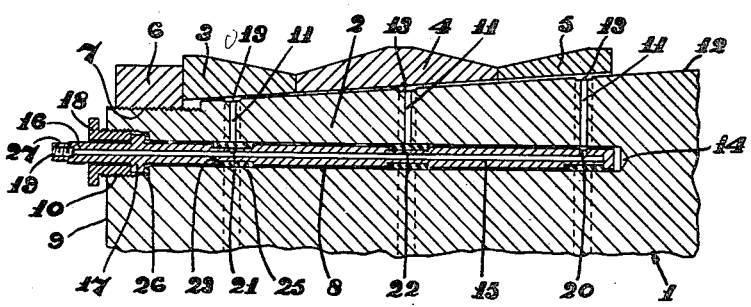
E. R. Gargan, Inventor deceased
By L. L. Gargan, Executrix
By Richards & Geier
Attorneys April 18, 1961     E. R. GARGAN     2,980,474
SHAFTS FOR CARRYING INTERFERENCE-FITTED MEMBERS THEREON
Filed March 17, 1958     3 Sheets-Sheet 2
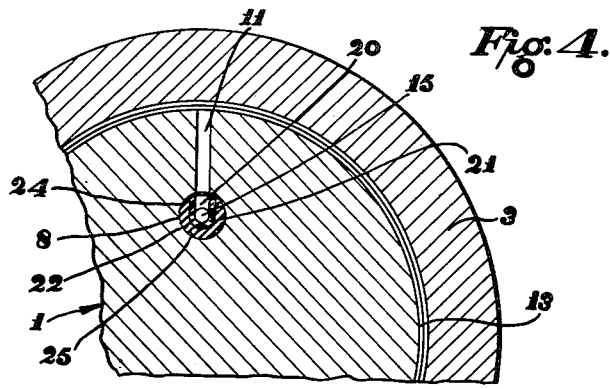
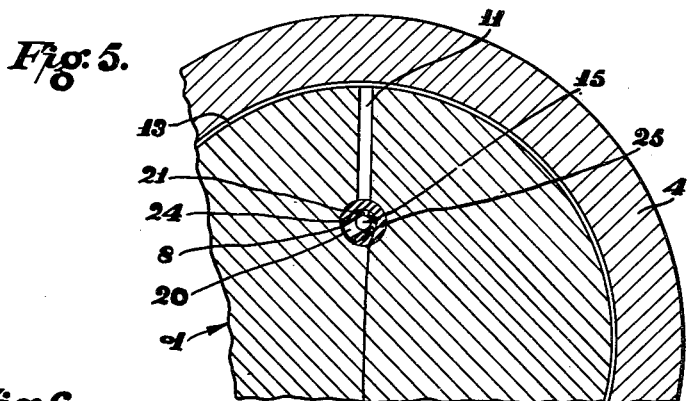
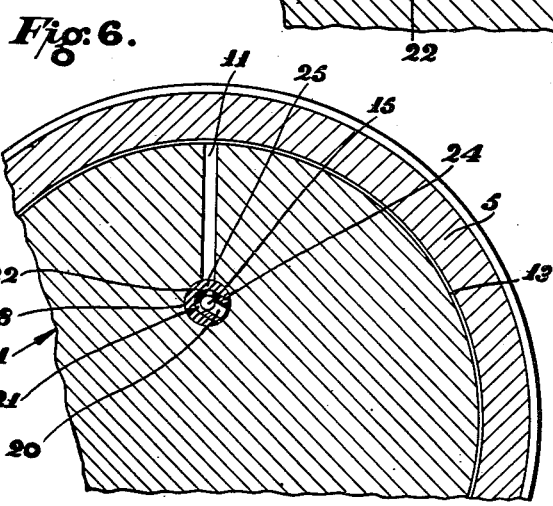
E. R. Gargan, Inventor, deceased
By L. L. Gargan, Executrix
By Richards & Geier
Attorneys

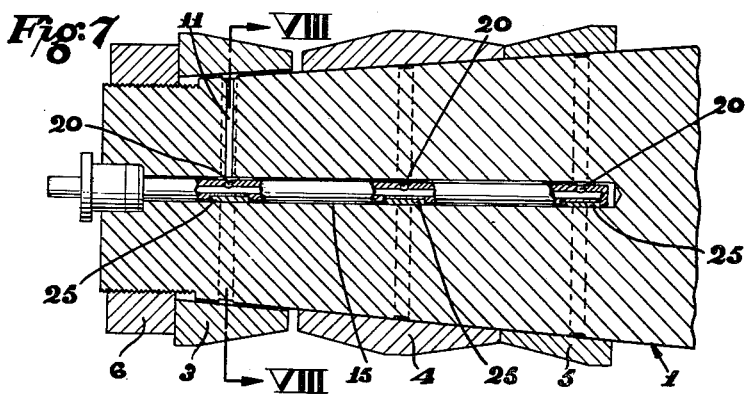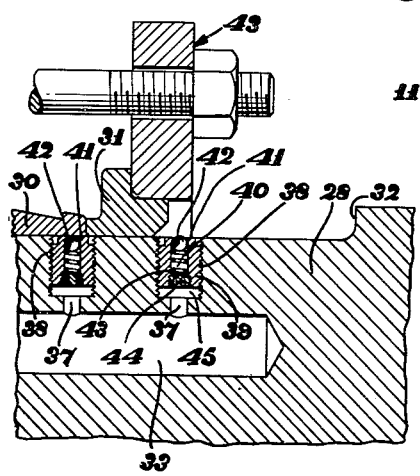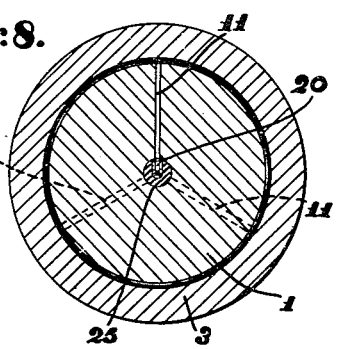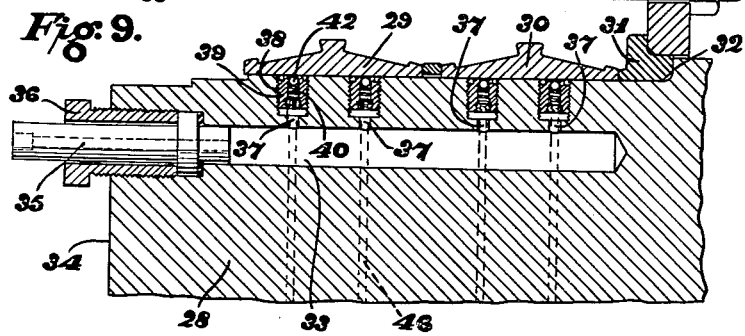

United States Patent Office 2,980,474
Patented Apr. 18, 1961

2,980,474

SHAFTS FOR CARRYING INTERFERENCE-FITTED MEMBERS THEREON

Ernest Robert Gargan, deceased, late of Daventry, England, by Lilian Lucina Gargan, executrix, Daventry, England, assignor to British Timken Limited, Birmingham, England, a British company Filed Mar. 17, 1958, Ser. No. 721,845

Claims priority, application Great Britain Mar. 30, 1957

10 Claims. (Cl. 308—236)

This invention relates to shafts intended to carry a plurality of interference-fitted members such as press-fit or shrunk-fit rolling-bearing race rings, and it is an object of the invention to provide such a shaft with improved and novel means whereby the removal of the interference-fitted members is facilitated.

It is already known to use oil or other fluid medium injected under pressure between the inter-engaging surfaces of a plurality of interference-fitted members carried on a shaft in order to facilitate their removal therefrom, and to this end, shafts have been provided with a plurality of axially-extending passages communicating with the surface of the shaft.

According to the present invention, a shaft intended for carrying thereon a plurality of interference-fitted members is provided with a single axially-extending fluid supply passage from which branch passages extend to the surface of the shaft for supplying fluid pressure to the respective interference-fitted members mounted thereon for the purpose of facilitating their removal, and control valve means are provided in association with said branch passages whereby fluid pressure is or can be prevented from being transmitted to the surface of the shaft at or through any one of the branch passages the outlet of which is not covered by an interference-fitted member.

In one form which is particularly suitable where the shaft is tapered in order to receive a plurality of interference-fitted members having contacting surfaces formed with a complementary taper, the valve means may comprise a feed tube rotatably mounted within a bore or passage extending along the shaft from one end thereof, the said tube being provided along its length with a plurality of openings or ports disposed in the wall of the tube and adapted, on rotating said tube, to be selectively placed in communication with transverse feed passages or channels leading to the portions of the peripheral surface of the shaft upon which the interference-fitted members are intended to be mounted. Sealing means may be provided for preventing leakage of the oil or other pressure medium and for ensuring that the latter can be supplied to the contacting surface of no more than one of the interference-fitted members for each particular angular setting of the rotatable feed tube.

In another form which is especially suitable for cylindrical shafts, the valve means may be self-sealing.

Thus, each branch passage may be controlled by a separate ball valve which comprises a ball normally spring-pressed upon a seating around the external outlet or orifice of the passage, said ball being arranged so as normally to project slightly above the surface of the shaft such that on being depressed, as by the presence of the press-fitted member upon the shaft, the ball is displaced from its seating thereby enabling fluid pressure to be transmitted to the surface of the shaft.

In the accompanying drawings,

Figures 1 to 3 are sectional views illustrating one form of the invention, including a rotatable feed tube, applied to a tapered shaft having mounted thereon, in side-by-side relationship, three press-fitted rolling-bearing inner race rings having conical inner peripheral surfaces, the different figures showing different angular positions of the feed tube.

Figures 4, 5 and 6 are respectively cross-sectional views on lines IV—IV, V—V and VI—VI of Figure 1.

Figure 7 is a part-sectional view of a tapered shaft illustrating a modification of the form shown in Figures 1 to 6.

Figure 8 is a cross sectional view on line VIII—VIII, Figure 7.

Figure 9 is a part-sectional view illustrating another form of the invention including self-sealing valves, applied to a cylindrical shaft upon which is mounted two side-by-side press-fitted rolling-bearing race rings.

Figure 10 is a fragmentary view of Figure 9, on a larger scale, showing the race rings in the process of being removed.

Referring now to Figures 1 to 6 of the drawings, the shaft 1 has a tapering end portion 2 upon which is mounted with an interference fit, three side-by-side rolling-bearing inner race rings 3, 4 and 5, which are formed with corresponding conical bores, and which are normally positively retained in position by a clamping nut 6 screwed on to a threaded portion 7 at the extremity of the shaft.

In accordance with the invention, the shaft 1 is provided internally with a bore or circular-sectioned passage 8 extending parallel to the axis from the one end 9, the portion of this bore or passage 8 immediately adjacent the end 9 of the shaft being of larger diameter than the remainder and being formed with an internal screw-thread 10 for receiving a retaining nut 18 as hereinafter described. Along the length of this internal bore or passage 8 at each of three positions corresponding to positions along the shaft at which the respective race rings 3, 4 and 5 are mounted, a subsidiary branch passage or channel 11 extends radially from the main bore or passage 8 to the outer peripheral surface 12 of the shaft, the three said passages 11 being situated in the same plane. At the other end of each of these subsidiary branch passages or channels 11, an annular groove 13 is formed around the outer periphery of the shaft 1 to facilitate the distribution of the pressure medium.

The internal bore or passage 8 in the shaft 1 is closed at its inner end 14, and rotatably mounted therein is a feed tube 15 by means of which a fluid medium such as oil may be supplied to the subsidiary branch passages or channels 11 leading to the peripheral surface portions 12 of the shaft. This feed tube 15 extends for substantially the whole length of the bore or passage 8 and towards its outer end 16, which extends a short distance beyond the end 9 of the shaft, it is formed with an enlarged portion or collar 17 which fits within the larger diameter outer end portion of the bore or passage 8, and forms an abutment preventing endwise movement of the feed tube 15 in an inwards direction. As hereinbefore mentioned, this larger diameter portion of the bore or passage 8 is formed with an internal screw-thread 10 so as to receive the screwed retaining sleeve or nut 18 which is adapted to engage the collar portion 17 on the feed tube 15 and thereby positively retain the latter in axial position. The outer end 16 of the feed tube 15 forms the inlet orifice through which the fluid medium is adapted to be delivered and it is provided with an internally screw-threaded portion 19 for receiving a suitable coupling connector from the source of supply of the fluid medium.

At positions spaced along the length of the feed tube 15 corresponding to the positions at which the subsidiary passages or channels 11 extend into the internal bore or passage 8 of the shaft 1, a set of three openings or ports 20, 21 and 22, are formed in the walls of the said tube 15, equiangularly disposed around the circumference at intervals of 120°. The tube 15 is also formed at each of these positions with a broad external groove or channel 23 in its outer surface, which groove or channel is of U-form, extending part way around the circumference and across the outer ends of two of the three said ports or openings 21 and 22. The third opening or port 20 of each set thus extends to the outer periphery of the tube 15 through a longitudinal rib 24 (see Figures 4 to 6) remaining between the ends of the U-shaped groove or channel 23. This groove or channel 23 is adapted to receive a sealing member of compressible material having a U-shaped cross-section which fits around the said groove and embraces the sides of the rib 24 containing the said third opening or port 20. This seal 25 thus covers the two openings or ports 21 and 22 of each set which lead into the channel or groove 23, leaving the third opening or port 20, which constitutes a feed hole, open and free to deliver the fluid medium therethrough into the corresponding subsidiary passage or channel 11 when correct alignment with the latter is obtained by rotating the feed tube 15. The relative disposition of the groove or channel 11 and sealing means 25 for the three different sets of ports or openings corresponding to each of the three subsidiary passages or channels 11 is such that the third or feed opening or port 20 of each set is in a different relative angular position with respect to the axis of the feed tube 15. This is made clear in the sectional views of Figures 4 to 6 and it will be seen that for any given angular setting of the feed tube 15, no more than one of the feed ports 20 can be opposite a corresponding subsidiary passage or channel 11. On delivering the oil or other fluid medium under pressure into the feed tube 15, for the purpose of removing the press-fitted members 3, 4 and 5 from the shaft 1, this fluid medium will therefore only be supplied to the inter-engaging surfaces of the shaft and one of the three members 3, 4 or 5 at any one time. Whilst for a given angular setting of the feed tube 15, the fluid medium is supplied from the said tube to one of the subsidiary passages or channels 11, the fluid medium under pressure will also exert a force on the seals 25 of the other two sets of openings or ports and will effectively cause the said seals to be tightly pressed into sealing contact with the inner ends of their corresponding subsidiary passages or channels 11, and escape or loss of the fluid medium will thereby be prevented. A suitable face seal 26 to prevent loss of the fluid medium is also inserted at the outer end of the feed tube 15, adjacent the collar portion 17 of the latter.

It will be understood that the seals 25 and 26 are made of an oil-resistant material and they may be of a suitable synthetic rubber.

In use, when the three press-fitted race ring members 3, 4 and 5 have been mounted on the shaft 1 and it is then subsequently required to remove them, the outer clamping nut 6 is slackened off and the pressure medium is then selectively supplied, after suitable angular adjustment of the feed tube 15, to the inter-engaging surfaces of the outermost member 3 on the shaft 1. In known manner, the pressure medium relieves the intermetallic contact between the press-fit member 3 and the shaft 1, and the said member is readily freed (see Figure 1). Having thus released the outermost member 3, the feed tube may be further rotated so as to bring it into a new angular position in which the pressure medium can be supplied in like manner to the next press-fit member 4, as shown in Figure 2. After release of this latter, the operation may be repeated so as to release the remaining innermost member 5 (Figure 3). Conveniently, it may be arranged for the feed tube 15 to be held normally against rotation by a sufficient tightening of the previously described retaining nut 18 so as to clamp the tube in position, and in this case, the said retaining nut 18 must first be slackened off when it is desired to alter the angular setting. To facilitate the turning of the feed tube 15, its outer end 16 is formed with suitable flat surfaces 27 for engagement of a spanner.

In the modification illustrated in Figures 7 and 8, wherein like references are used to denote similar parts, instead of the transverse subsidiary passages or channels 11 in the shaft 1 all being aligned in the same plane and the feed ports 20 in the tube 15 being disposed in different relative angular positions, the arrangement is reversed, with the feed ports 20 all aligned in one plane and the transverse passages 11 aligned in different angularly displaced planes. This arrangement functions in exactly the same manner as does the first-described embodiment.

Referring now to Figures 9 and 10, which illustrate an embodiment of the invention including self-sealing valves, the end of the shaft 28 is shown as being of cylindrical form and is intended to carry, in side-by-side relationship, two press-fitted rolling-bearing inner race rings 29 and 30 which are positioned up against an annular abutment member 31 seated against a shoulder 32 on the shaft.

In accordance with the invention, the shaft 28 is provided with a closed passage or bore 33 extending in an axial direction from the one end 34 of said shaft. In contrast to the bore or passage 8 of the first-described embodiment, this passage 33 does not contain a separate feed tube but itself forms a main fluid supply passage. A coupling member 35 fitted into the outer open end of the passage 33 and retained by a nut 36, serves for connection to a pressurized supply of the fluid medium, such as oil.

Leading from spaced positions along the length of the main fluid supply passage 33 are radially-extending branch passages 37 which are arranged in two pairs respectively located along the shaft 28 at positions opposite the respective press-fitted race rings 29 and 30 when the latter are in place on the shaft. The outer end of each branch passage 37 opens into a screw-threaded socket 38 in the peripheral portion of the shaft 28 which socket contains a self-sealing valve device which is incorporated in a short cylindrical housing 29 screwed into said socket 38. This housing 39 of the valve device is formed with an axial bore 40 which is aligned with the respective branch passage 37 and which, at its outer end adjacent the surface of the shaft, is narrowed to provide a restricted external outlet or orifice and to form an internal seating 41 for a ball 42 contained within the bore. This ball 42 is normally pressed against its seating 41 by a spring 43 which is supported by a perforated plug 44 within the bore 40, and it is arranged that when the ball 42 is properly seated, thereby closing the valve, a small portion of the peripheral surface of the ball protrudes through the external outlet or orifice so as to be slightly above the exterior surface of the shaft (see right-hand valve in Figure 10). On placing a close-fitting member, such as the race rings 29 or 30, over the shaft, however, the ball 42 becomes depressed inwards, being displaced off its seating 41 and thereby automatically opening the valve. A suitable sealing washer 45 is provided for preventing leakage of the fluid under pressure along the screw-threads of the valve housing 39.

As in the first-described embodiment, shallow annular grooves 46 are formed around the surface of the shaft 28 at the external outlet of each branch passage 37 for facilitating the distribution of the pressure fluid.

In use, the two press-fitted race rings 29 and 30 are fitted on the end of the shaft 28 so that each covers the external orifices relating to one pair of the branch passages 37 and depresses the respective balls 42, thereby causing the valves associated with said branch passages to remain open. When it is subsequently desired to remove the race rings 29 and 30, oil or other fluid is supplied under pressure to the inter-engaging surfaces of the race rings and the shaft, by way of the aforesaid main fluid supply passage 33 and each of the branch passages 37. In known manner, the oil relieves the interference fit of the race rings 29 and 30, and by means of a suitable hydraulic screw, or other removal device, part of which is indicated at 43, engaged behind the innermost race ring 30 or the abutment member 31, both race rings may be readily and smoothly drawn off the shaft. During this withdrawal process, as the race rings are moved axially outwards, it will be understood that a point will be reached when the innermost race ring 30, although not yet freed from the shaft 28, will have moved clear of the innermost branch passage 37, as indicated in Figure 10. By virtue of the valve means, however, this innermost branch passage will be automatically closed, as soon as its external orifice or opening is exposed, by the ball valve 42 which returns to its seating 41, and the escape of the oil or other pressure fluid is thus prevented. A similar action occurs as the ball valves of each of the other branch passages 37 are successively uncovered during the removal process.

Within the scope of the invention, any desired number, greater than one, of these branch passages 37 may be provided in the shaft. In general, it will be necessary to provide a sufficient number of spaced branch passages so that the application of fluid pressure to each interference-fitted member can be maintained during the withdrawal process until each member is finally freed from the shaft and it will be understood that the provision of self-sealing valves in accordance with the last-described embodiment is particularly suitable for shafts of cylindrical form.

In order to reduce the distance by which the interference-fitted members need to be moved before being freed from the shaft, the latter may be stepped in known manner, so that the innermost members are positioned on portions of the shaft having progressively slightly greater diameters.

I claim:

1. In combination, a shaft, a plurality of interference-fitted members carried by said shaft, means for supplying fluid under pressure to the surface of said shaft for the purpose of facilitating the removal of respective interference-fitted members carried thereon, said means comprising an axially-extending fluid supply passage in said shaft and branch passages leading therefrom to the surface at positions corresponding to the positions of the respective interference-fitted members, control valve means in association with said branch passages, whereby fluid pressure can be prevented from being transmitted to the surface of the shaft through any selected one of the branch passages the outlet end of which is not covered by an interference-fitted member, and sealing means associated with each of the branch passages.

2. In combination, a shaft, a plurality of interference-fitted members carried by said shaft, means for supplying fluid under pressure to the surface of said shaft for the purpose of facilitating the removal of respective interference-fitted members carried thereon, said means comprising an axially-extending fluid supply passage in said shaft and branch passages leading therefrom to the surface at positions corresponding to the positions of the respective interference-fitted members, control valve means in association with said branch passages, whereby fluid under pressure can be selectively supplied to the respective contacting surfaces of the shaft and of any selected one of the said interference-fitted members, and sealing means associated with each of the branch passages.

3. In combination, a shaft, a plurality of interference-fitted members carried by said shaft, means for supplying fluid under pressure to the surface of said shaft for the purpose of facilitating the removal of respective interference-fitted members carried thereon, said means comprising a feed tube rotatably mounted within an axially-extending passage in the shaft and branch passages leading from said feed tube to the surface, said feed tube being provided along its length with a plurality of ports whereby the interior of said tube can be selectively placed in communication with the various branch passages upon turning the feed tube into different angular positions, and sealing means associated with each of the branch passages.

4. In combination, a shaft, a plurality of interference-fitted members carried by said shaft, means for supplying fluid under pressure to the surface of said shaft for the purpose of facilitating the removal of respective interference-fitted members carried thereon, said means comprising a feed tube rotatably mounted within an axially-extending passage in the shaft and branch passages leading from said feed tube to the surface, said branch passages all being aligned in the same plane and said feed tube being provided along its length with a plurality of ports orientated in different angular positions about the axis of the tube, whereby the interior of said tube can be selectively placed in communication with the various branch passages upon turning the feed tube, and sealing means associated with each of the branch passages.

5. A device in accordance with claim 1, wherein said control valve means comprise a feed tube rotatably mounted within said axially-extending passage in the shaft and wherein said branch passages are all orientated in different angular positions about the axis of the feed tube, and the latter being formed along its length with a plurality of ports all aligned in the same plane, whereby the interior of said tube can be selectively placed in communication with the various branch passages upon turning said tube.

6. In combination, a shaft, a plurality of interference-fitted members carried by said shaft, means for supplying fluid under pressure to the surface of said shaft for the purpose of facilitating the removal of respective interference-fitted members carried thereon, said means comprising a feed tube rotatably mounted within an axially extending passage in the shaft and branch passages leading from said feed tube to the surface, said tube being provided along its length with a plurality of ports whereby the interior of said tube can be selectively placed in communication with the various branch passages upon turning the feed tube into different angular positions, and sealing means for preventing leakage of the pressure fluid and for ensuring that the latter can be supplied to no more than one of the interference-fitted members for each different angular setting of the rotatable feed tube.

7. A device in accordance with claim 1, wherein said control valve means consist of a separate self-sealing ball valve in association with each branch passage, which ball valve is normally closed but which is adapted to be opened by the presence of a close-fitting member covering the outlet of the branch passage.

8. A device, as claimed in claim 7, in which said ball valve comprises a ball and a seating around the external outlet of the branch passage, against which seating the ball is normally spring-pressed so as to close said outlet, and in which position the ball projects slightly above the adjacent surface of the shaft.

9. A device in accordance with claim 1, wherein said control valve means consist of separate self-sealing ball valves forming a self-contained unit inserted into the outer end portion of each branch passage, each of said ball valves being normally closed but being adapted to be opened by the presence of a close-fitting member covering the outlet of the respective branch passage.

10. A device in accordance with claim 1, wherein each interference-fitted member covers the outlets of at least two of said branch passages, and wherein said control valve means consist of a separate self-sealing ball valve in association with each branch passage, which ball valve is maintained open by the presence of an interference-fitted member covering the outlet of the respective branch passage.

References Cited in the file of this patent
UNITED STATES PATENTS

| | | |
|---|---|---|
| 2,641,280 | Fleischhauer | June 9, 1953 |
| 2,817,142 | Boden et al. | Dec. 24, 1957 |
| 2,840,399 | Harless et al. | June 24, 1958 |